(12) United States Patent
Issagholian-Havai

(10) Patent No.: US 7,493,685 B2
(45) Date of Patent: Feb. 24, 2009

(54) METHOD AND APPARATUS FOR FABRICATING ARCUATE SHEET METAL COMPONENTS FOR HVAC DUCT SYSTEMS

(76) Inventor: Robert Issagholian-Havai, 5119 Azusa Canyon Rd., Baldwin Park, CA (US) 91706

( * ) Notice: Subject to any disclaimer, the term of this patent is extended or adjusted under 35 U.S.C. 154(b) by 459 days.

(21) Appl. No.: 10/976,828

(22) Filed: Oct. 29, 2004

(65) Prior Publication Data
US 2006/0090339 A1    May 4, 2006

(51) Int. Cl.
*B21D 39/02* (2006.01)
(52) U.S. Cl. .................. 29/463; 72/252.5; 72/366.2; 72/377
(58) Field of Classification Search .................. 29/463; 72/167, 379.6, 377, 135, 166, 179, 182, 252.5, 72/365.2, 366.2
See application file for complete search history.

(56) References Cited

U.S. PATENT DOCUMENTS

| | | | | |
|---|---|---|---|---|
| 1,761,888 A | * | 6/1930 | Junkers | 72/303 |
| 4,367,640 A | * | 1/1983 | Heitzman | 72/11.2 |
| 4,707,899 A | * | 11/1987 | Singer | 29/890.01 |
| 5,253,501 A | * | 10/1993 | Spath | 72/167 |
| 6,286,352 B1 | * | 9/2001 | Hackstock | 72/167 |
| 7,124,609 B1 | * | 10/2006 | Hermanson | 72/82 |
| 2002/0124614 A1 | * | 9/2002 | Hermanson | 72/82 |
| 2004/0250596 A1 | * | 12/2004 | Hermanson | 72/370.26 |

* cited by examiner

*Primary Examiner*—David P Bryant
*Assistant Examiner*—Christopher M Koehler
(74) *Attorney, Agent, or Firm*—Tod R. Nissle, P.C.

(57) ABSTRACT

A method and apparatus for fabricating arcuate sheet metal components for HVAC duct systems passes an elongate straight preformed strip of metal between a pair of rollers to deform the strip to form arcuate sheet metal duct components.

1 Claim, 12 Drawing Sheets

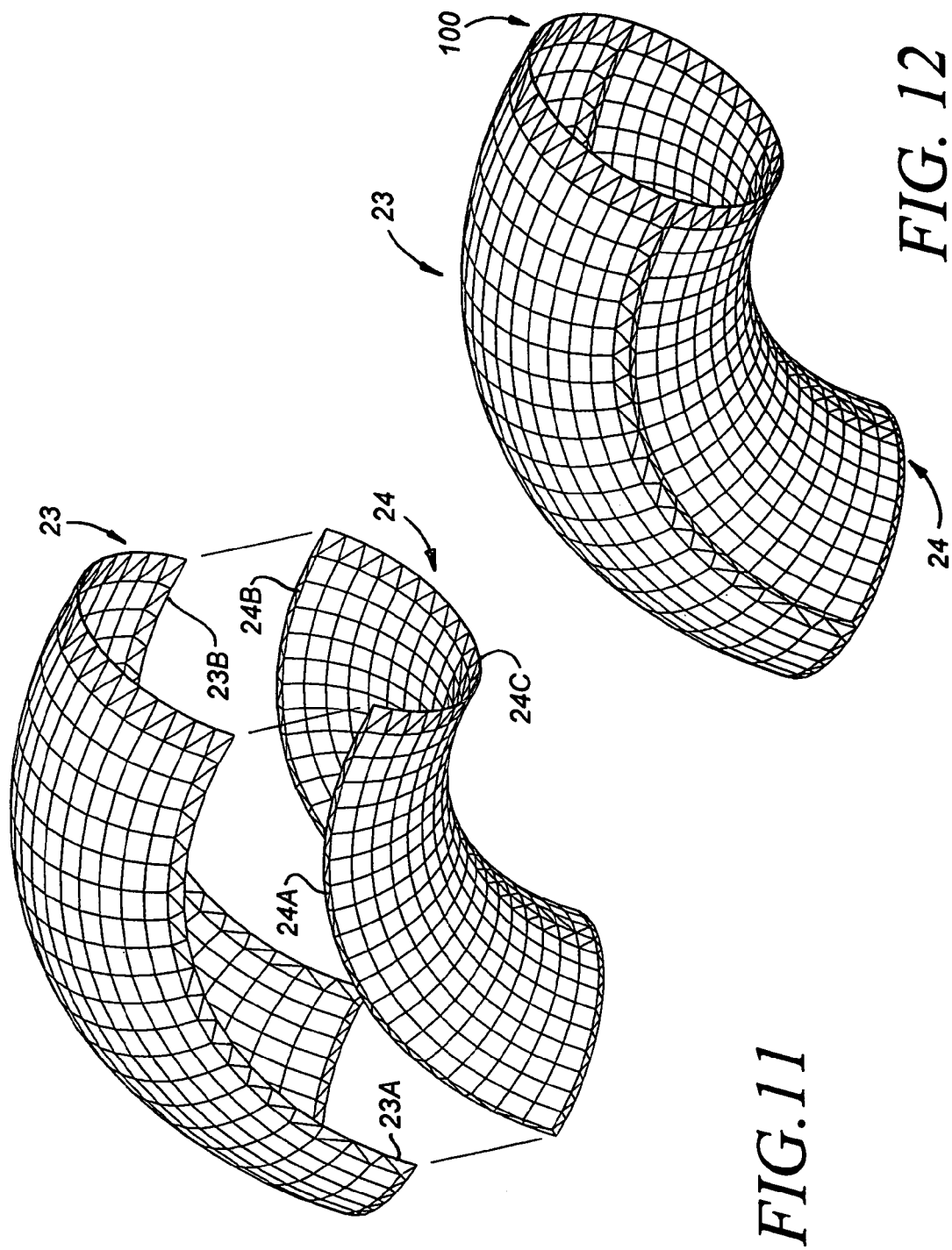

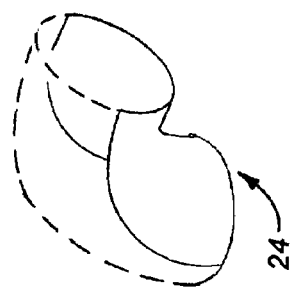
*FIG. 13*
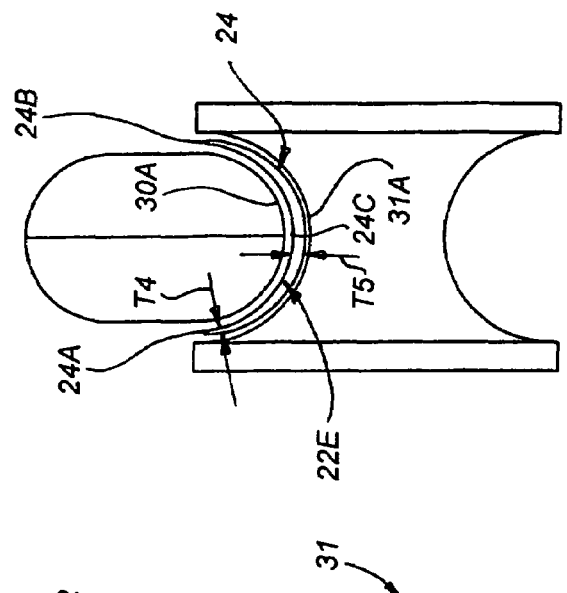
*FIG. 16*
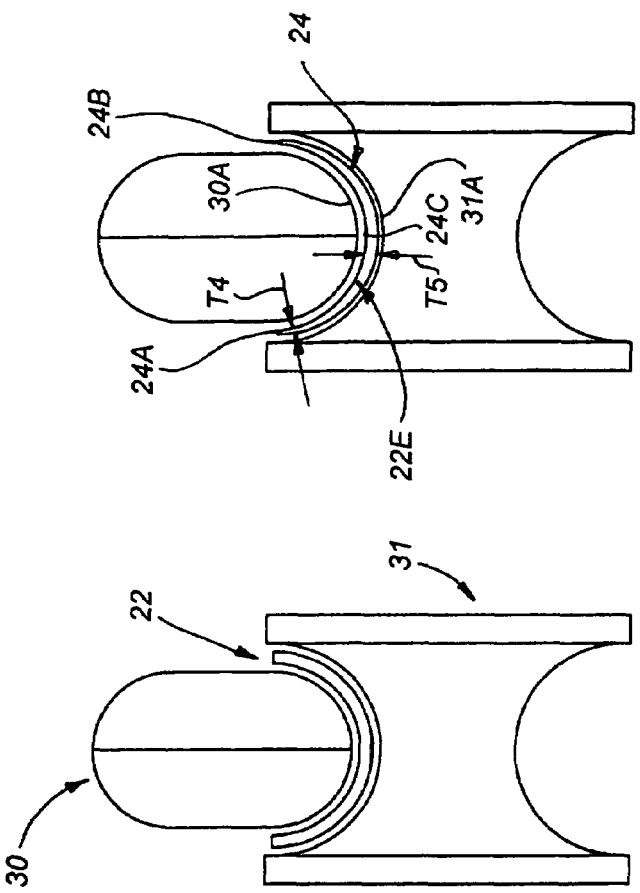
*FIG. 14*
*FIG. 15*

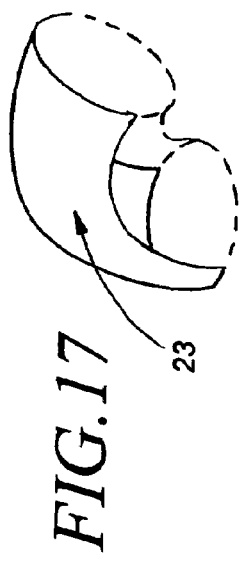
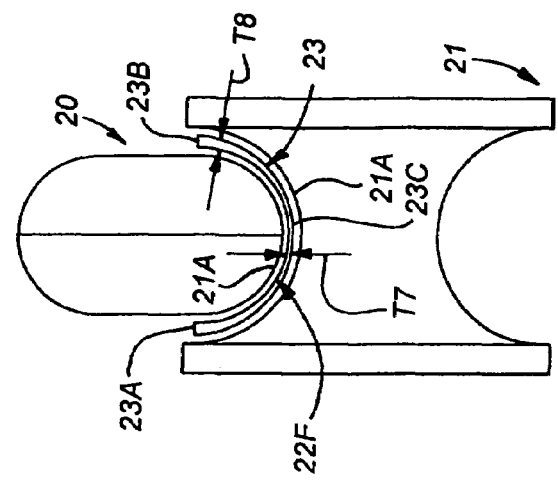
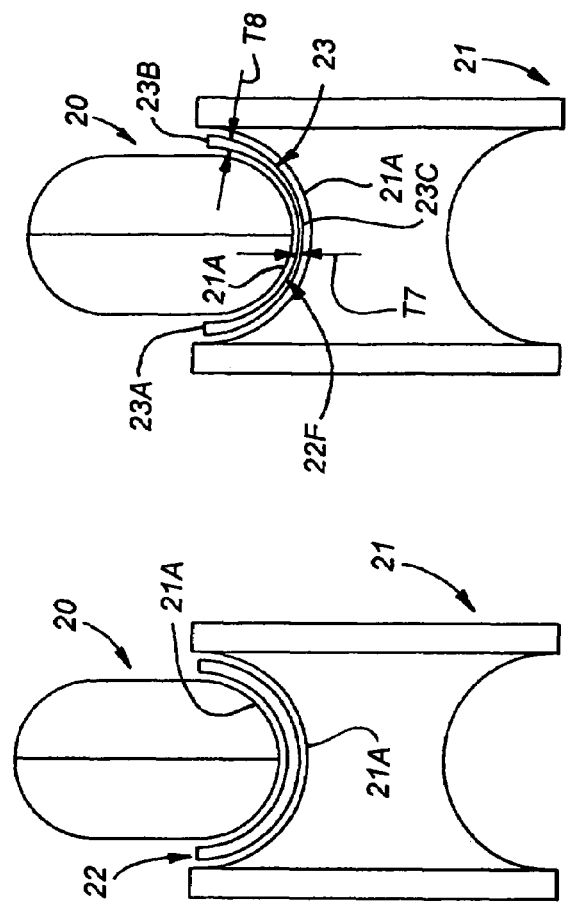
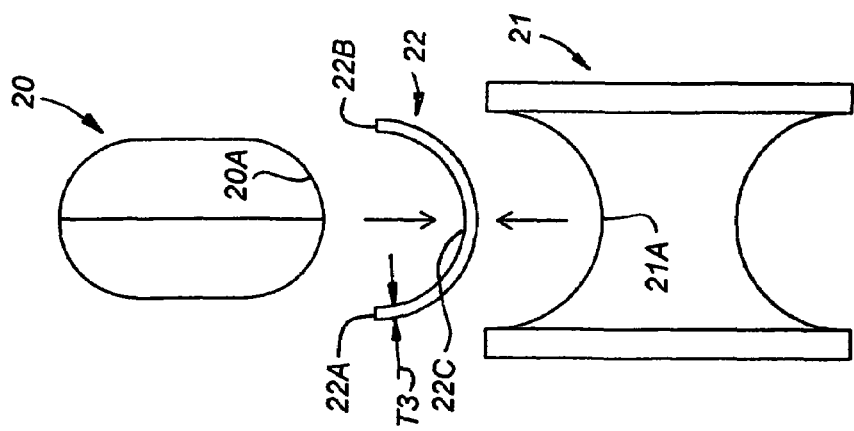

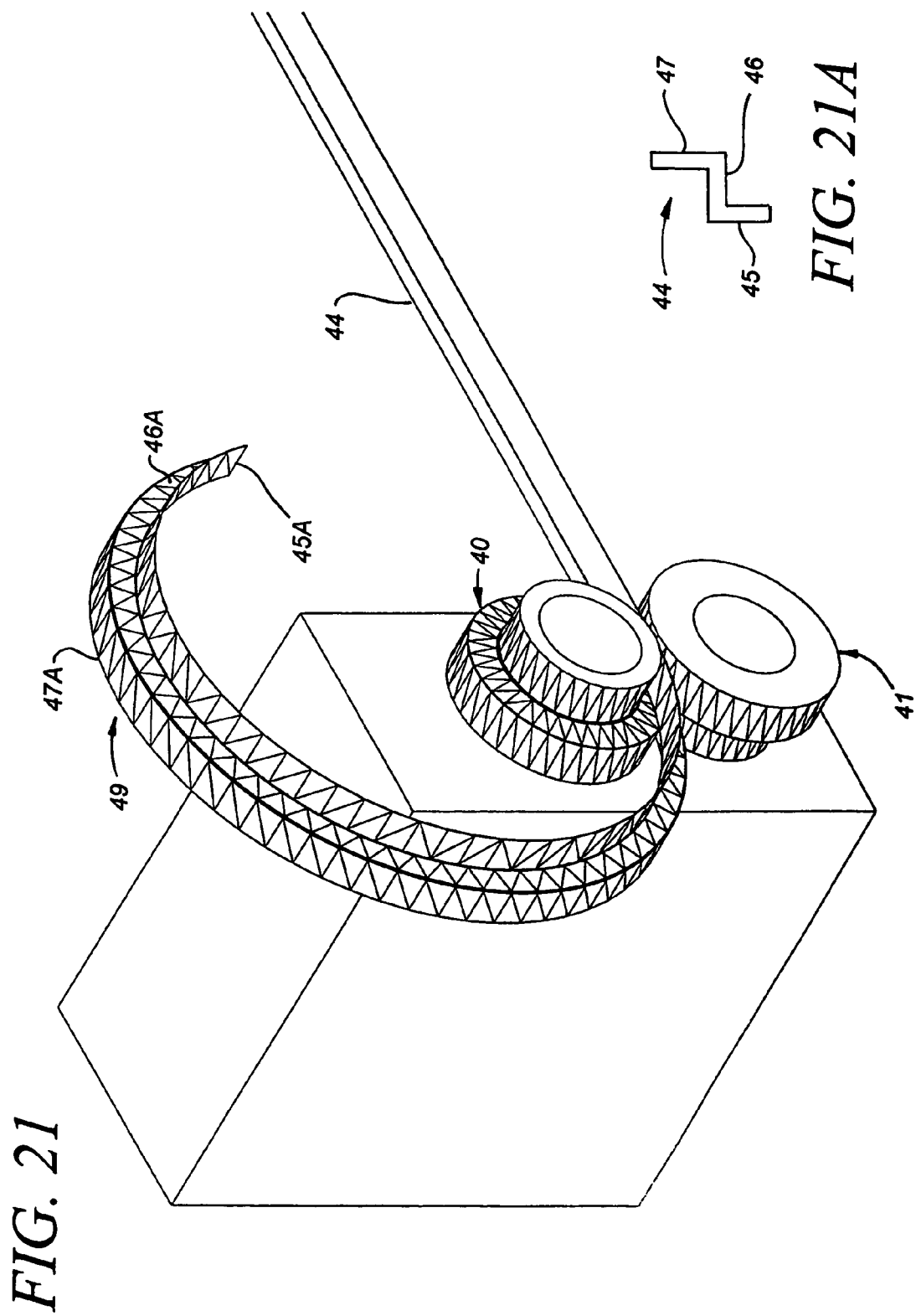

METHOD AND APPARATUS FOR FABRICATING ARCUATE SHEET METAL COMPONENTS FOR HVAC DUCT SYSTEMS

This invention pertains to systems that utilize components fabricated from sheet metal and other panel material.

More particularly, the invention pertains to a method and apparatus for fabricating components from sheet metal and other sheet materials.

In a further respect, the invention pertains to a method and apparatus for rolling sheet metal into arcuate components that include portions each having a different diameter.

Sheet metal parts for use in heating, ventilation, and air conditioning (HVAC) duct systems and in other systems are typically produced by stamping or by spinning. Spinning a cylindrical part to produce an arcuate flange on one end of the part can take several minutes. Stamping is often used to produce sheet metal parts, but also tends to be labor and time intensive, because metal sheet must be placed in and removed from the stamping equipment. It would be desirable to produce a method and apparatus to reduce cost and increase productivity in the manufacture of sheet metal components, particularly hollow sheet metal components including rounded portions.

Therefore, it is a principal object of the instant invention to provide a method and apparatus for reducing the cost of producing hollow sheet metal components for air conditioning duct systems and other systems.

Another object of the invention to provide an improved method and apparatus for producing hollow, arcuate sheet metal components having differing inner diameters along the length of the components.

These and other, further and more specific objects and advantages of the invention will be apparent from the following detailed description of the invention, taken in conjunction with the drawings, in which:

FIG. 11 is a perspective view illustrating the assembly of the sheet metal parts of FIGS. 8 and 9;

FIG. 12 is a perspective view illustrating the assembled sheet metal parts of FIGS. 8 and 9;

FIG. 13 is a perspective view further illustrating the sheet metal part of FIG. 10;

FIG. 14 is a side view illustrating the rollers and preformed metal strip utilized to produce the part of FIG. 13;

FIG. 15 is a side view illustrating an end of the preformed metal strip just prior to passing between the rollers of FIG. 14;

FIG. 16 is a side view illustrating an end of the preformed metal strip after it has passed intermediate the rollers of FIG. 14;

FIG. 17 is a perspective view further illustrating the sheet metal part of FIG. 8;

FIG. 18 is a side view illustrating the rollers and preformed metal strip utilized to produce the part of FIG. 17;

FIG. 19 is a side view illustrating one end of the preformed metal strip just prior to passing between the rollers of FIG. 18;

FIG. 20 is a side view illustrating an end of the preformed metal strip after it has passed intermediate the rollers of FIG. 20;

FIG. 21 is a perspective view illustrating the use of a pair of opposed rollers to process a preformed metal strip to form a still another sheet metal part in accordance with the invention;

FIG. 21A is an end view illustrating the metal strip of FIG. 21 before it passes intermediate the rollers of FIG. 21;

Figure 1:
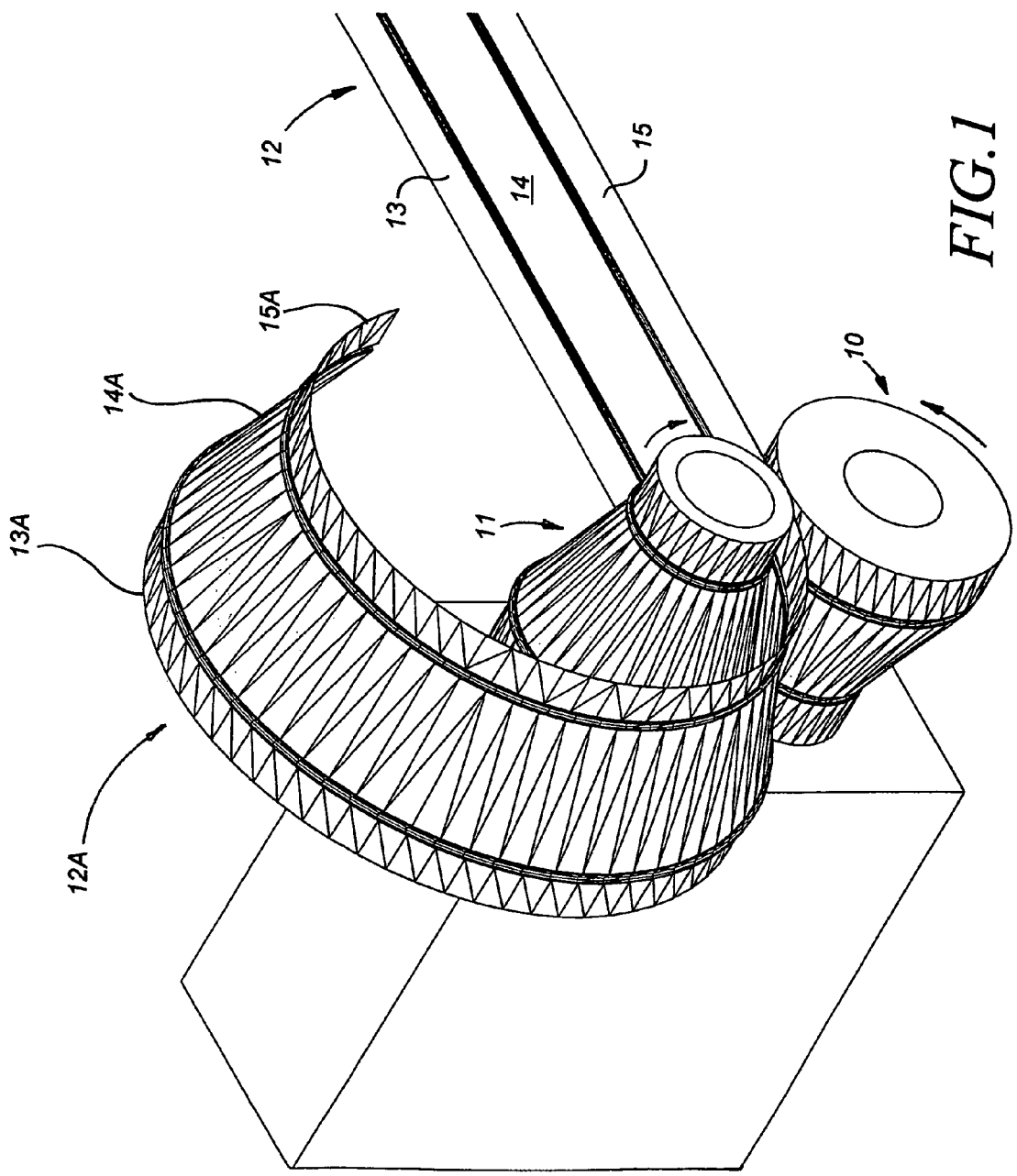
FIG. 1 is a perspective view illustrating the use of a pair of opposed rollers to form a hollow, round sheet metal part in accordance with the invention.

Briefly, in accordance with my invention, I provide an improved method for producing a hollow sheet metal part for a HVAC duct. The method includes the step of providing an elongate strip of metal sheet material. The strip of metal sheet includes a first portion having a first thickness and to be rolled into a hollow first round configuration having at least a first diameter; and, includes a second portion having a second thickness. The second portion is connected to the first portion, and is to be rolled into a hollow second round configuration having at least a second diameter greater than the first diameter. The method also includes the step of providing a pair of rollers shaped and dimensioned to receive the elongate strip of sheet material to roll the first portion into the first round configuration while generally maintaining the first thickness. The rollers also roll the second portion into the second round configuration while reducing said second thickness. The method includes the step of feeding the strip of material through said rollers to produce the hollow sheet metal part.

In another embodiment of the invention, I provide an improved method for producing a hollow sheet metal part for a HVAC duct. The method includes the step of providing an elongate strip of metal sheet material. The strip of sheet metal material includes a first portion having a first thickness and to be rolled into a hollow first round configuration having at least a first diameter. The strip of sheet metal also includes a second portion that has a second thickness, is connected to the first portion, and is to be rolled into a hollow second round divergent configuration having at least second and third diameters each greater than the first diameter. The third diameter is greater than the second diameter. The method also includes the step of providing a pair of rollers shaped and dimensioned to receive said elongate strip of sheet material to roll the first portion into the first round configuration while generally maintaining the first thickness, and to roll the second portion into the divergent configuration while reducing said second thickness. The method also includes the step of feeding said strip of material through the rollers to produce the hollow sheet metal part.

In a further embodiment of the invention, I provide an improved method for producing a hollow sheet metal part for a HVAC duct. The method includes the step of providing an arcuate elongate hollow strip of metal sheet material having a pair of edges, the edges each having a thickness, and having an intermediate arcuate portion extending between the edges. The arcuate portion has a thickness. The strip is rolled to form an elbow. The method also includes the step of providing a pair of rollers shaped and dimensioned to receive the elongate strip of sheet material to perform one of a pair of operations consisting of rolling the pair of edges to generally maintain the thicknesses of the pair of edges and rolling the arcuate portion to reduce the thickness of the arcuate portion, and of rolling at least one of the pair of edges to reduce the thickness of the one of said edges and rolling the arcuate portion to generally maintain the thickness of the arcuate portion. The method also includes the step of feeding the strip of material through the rollers to produce the hollow sheet metal part.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a pair of opposed rollers 10 and 11 processing a pre-formed strip 12 of metal or other material. Metal strip 12 is in a flat "Z-configuration" (FIG. 4) and includes legs 13 and 15 and intermediate portion 14 interconnecting legs 13 and 15. When strip 12 passes between rollers 10 and 11, rollers 10 and 11 compress, elongate, and thin portions of strip 12 to produce an arcuate hollow rounded strip 12A.

Figure 2:
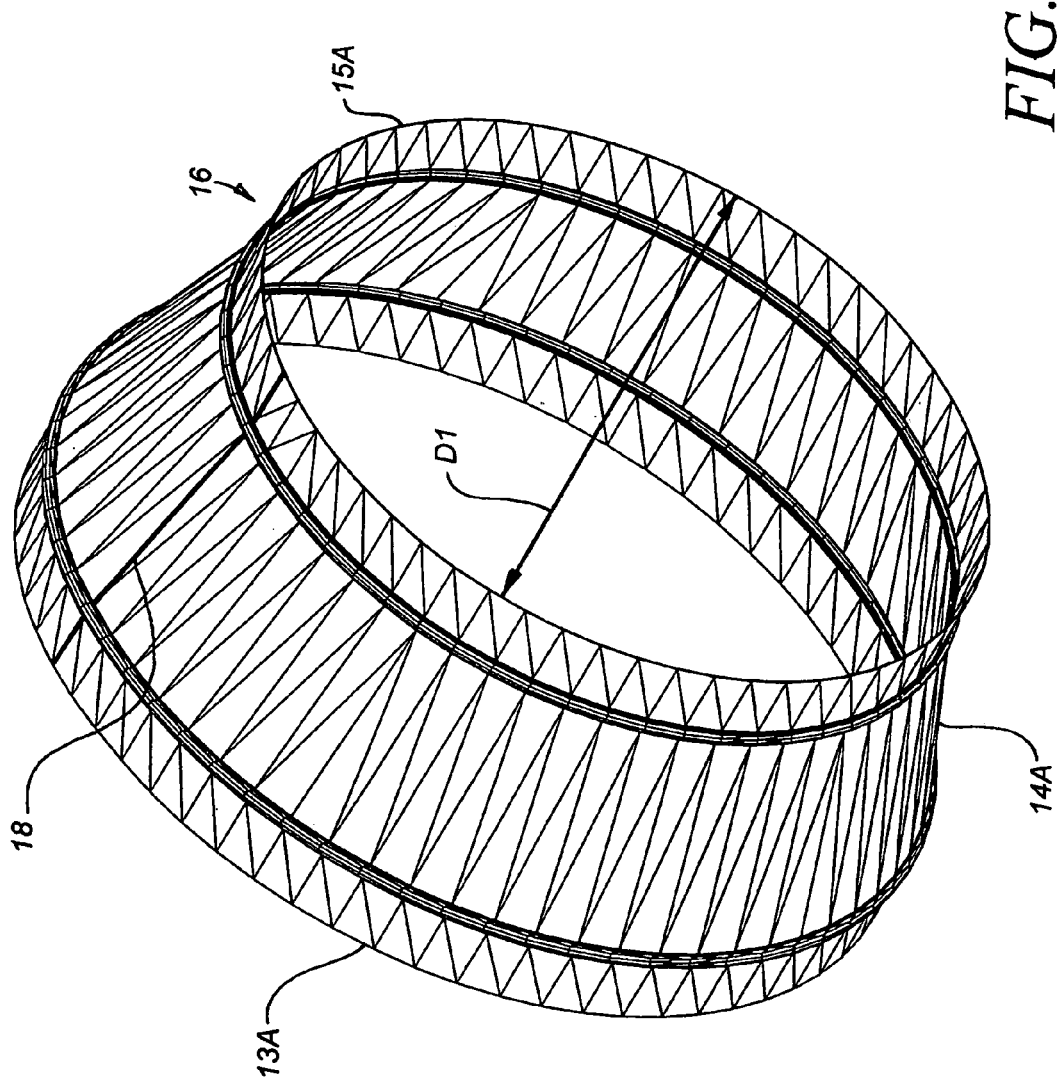
FIG. 2 is a perspective view illustrating the sheet metal part produced by the rollers of FIG. 1.
Figure 3:
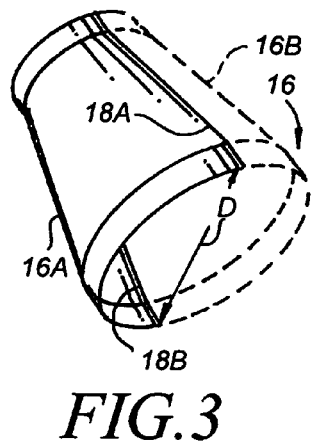
FIG. 3 is a perspective view further illustrating a sheet metal part produced by the rolling process of FIG. 1.

One piece can be cut from strip 12A to form the hollow cylindrically shaped component 16 illustrated in FIG. 2. In this case, the component 16 consists of a single piece 16 that has two ends that are welded together 18 or are otherwise attached. Or, as is illustrated in FIG. 3, two or more pieces 16 and 16A can be cut from strip 12A and welded together along edges 18A and 18B to form hollow component 16.

Figure 5:
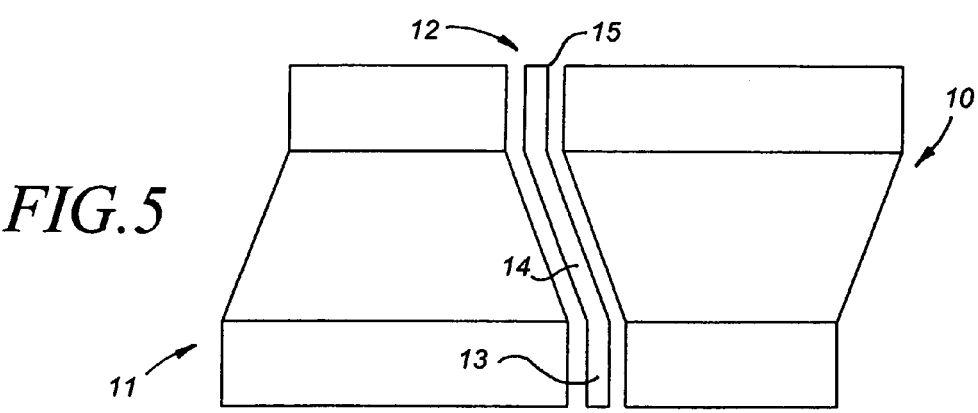
FIG. 5 is a side elevation view illustrating the shape and dimension of an end of the metal strip of FIG. 4 just prior to passing between the rollers of FIG. 4.
Figure 4:
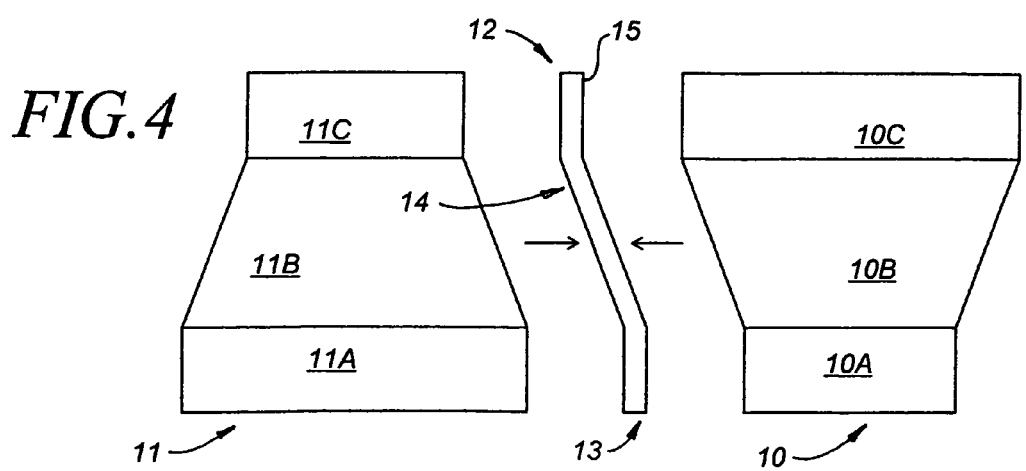
FIG. 4 is a side elevation view illustrating the rollers and preformed metal strip utilized in producing the metal part of FIG. 3.

FIGS. 4 and 5 illustrate roller 11 with generally cylindrical surfaces 11A and 11C and with generally conical surface 11B. Roller 10 includes generally cylindrical surfaces 10A and 10C and generally conical surface 10B. Surfaces 11A, 11B, 11C can be rounded and shaped about multiple axes, in the same fashion that the surface of an egg is rounded about multiple axes. FIG. 4 also provides a view of an end of strip 12 before strip 12 passes between rollers 10 and 11.

Figure 6:
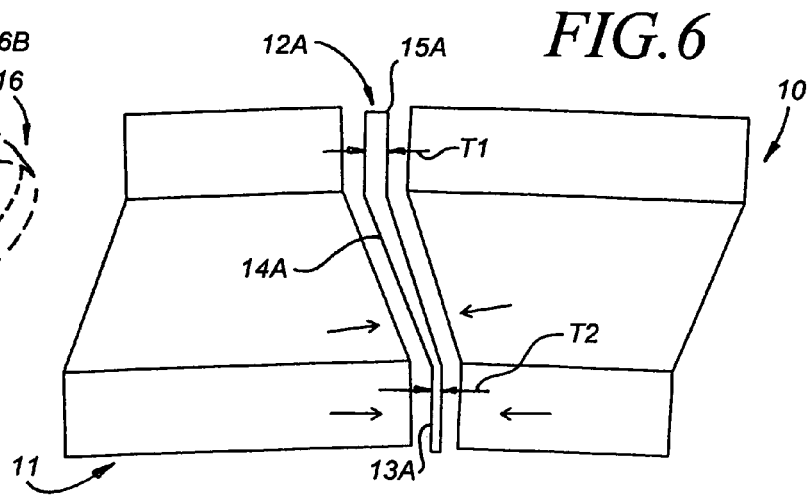
FIG. 6 is a side elevation view illustrating the shape and dimension of an end of the metal strip of FIG. 4 after it passes intermediate the rollers of FIG. 4 and is in part compressed and lengthened.

FIG. 6 illustrates the strip 12A that is produced when strip 12 passes intermediate rollers 10 and 11 and is worked. The thickness T1 of section 15A is generally equal to the thickness of section 15. The thickness T2 of section 13A is less than the thickness of section 13. The thickness of section 14A tapers from a thickness at the upper end of section 14A that is equivalent to the thickness of section 15A to a thickness at the lower end of section 14A that is equivalent to the thickness of section 13A. Rollers 10 and 11 are oriented and surfaces 11A to 11C and 10A to 10C are formed to work pre-formed strip 15 to produce strip 15A. The thickness of section 13 is reduced to thickness T2 in order to lengthen section 13 to increase the diameter of section 13 to produce circular section 13A having an inner diameter D (FIG. 3) that is greater than the inner diameter D1 (FIG. 2) of section 15A. The thickness of section 14 is reduced by increasingly greater amounts along its length extending from section 15A to section 13A to increase the diameter of section 14A by increasingly greater amounts along the length. In order to obtain the desired inner diameters D and D1 and the desired inner diameters along conical section 14A, rollers 10 and 11 preferably should be fabricated to close tolerances, typically to within 0.001 inch.

One important virtue of the method and apparatus illustrated in FIGS. 4 to 6 is that it permits hollow components to be rapidly produced by feeding a strip 12 intermediate a pair of rollers. Strip 12 can, if desired, be completely flat when fed intermediate rollers 10 and 11. When strip 12 is, however, flat, there is an increased risk that the metal or other material comprising strip 12 will buckle or be otherwise damaged. It is therefore presently preferred that strip 12 be preformed to facilitate the working of strip 12 by rollers 11 and 12. Section 13A ordinarily has a thickness T2 that is 5% to 20%, preferably 10% to 15%, less than thickness T1 and less than the thickness of strip 12.

Figures 7, 8:
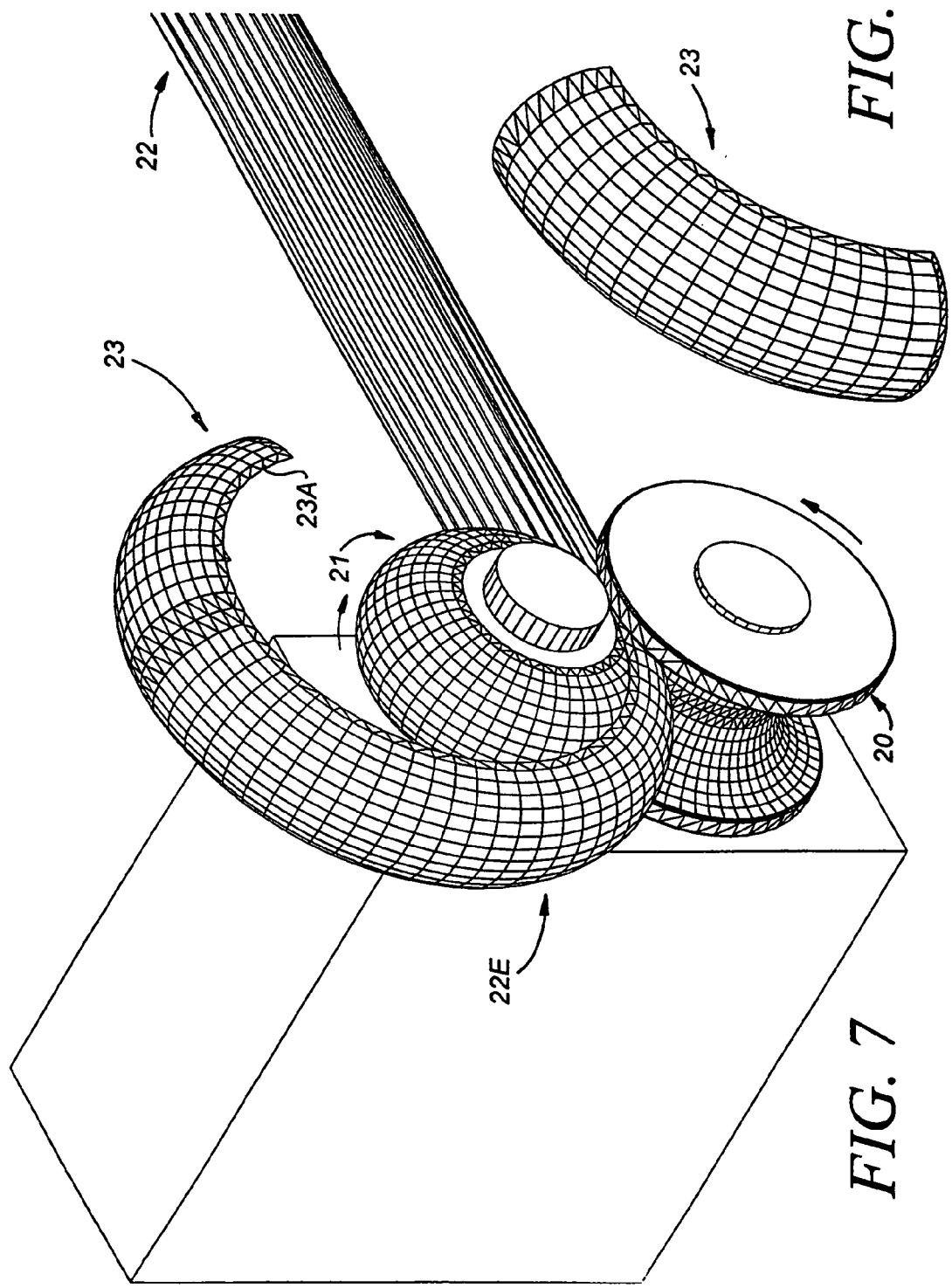
FIG. 7 is a perspective view illustrating the use of a pair of opposed rollers to form a sheet metal part in accordance with the invention.
FIG. 8 is a perspective view illustrating a sheet metal part produced by the rollers of FIG. 7.

FIG. 7 illustrates a pair of opposed rollers 20 and 21 processing a pre-formed strip of metal or other material 22. Metal strip 22 is in a semi-cylindrical configuration (FIGS. 15, 16) and includes edges 22A and 22B and intermediate arcuate portion 22C extending between edges 22A and 22B. When strip 22 passes between rollers 20 and 21, it produces a strip 22E that includes an arcuate hollow rounded strip or elbow 23 (FIG. 8) that is cut from the end of strip 22E. After elbow 23 is cut from the end of strip 22E, additional elbows equivalent in shape and dimension to elbow 23 can, of course, also be cut from strip 22E.

Figures 9, 10:
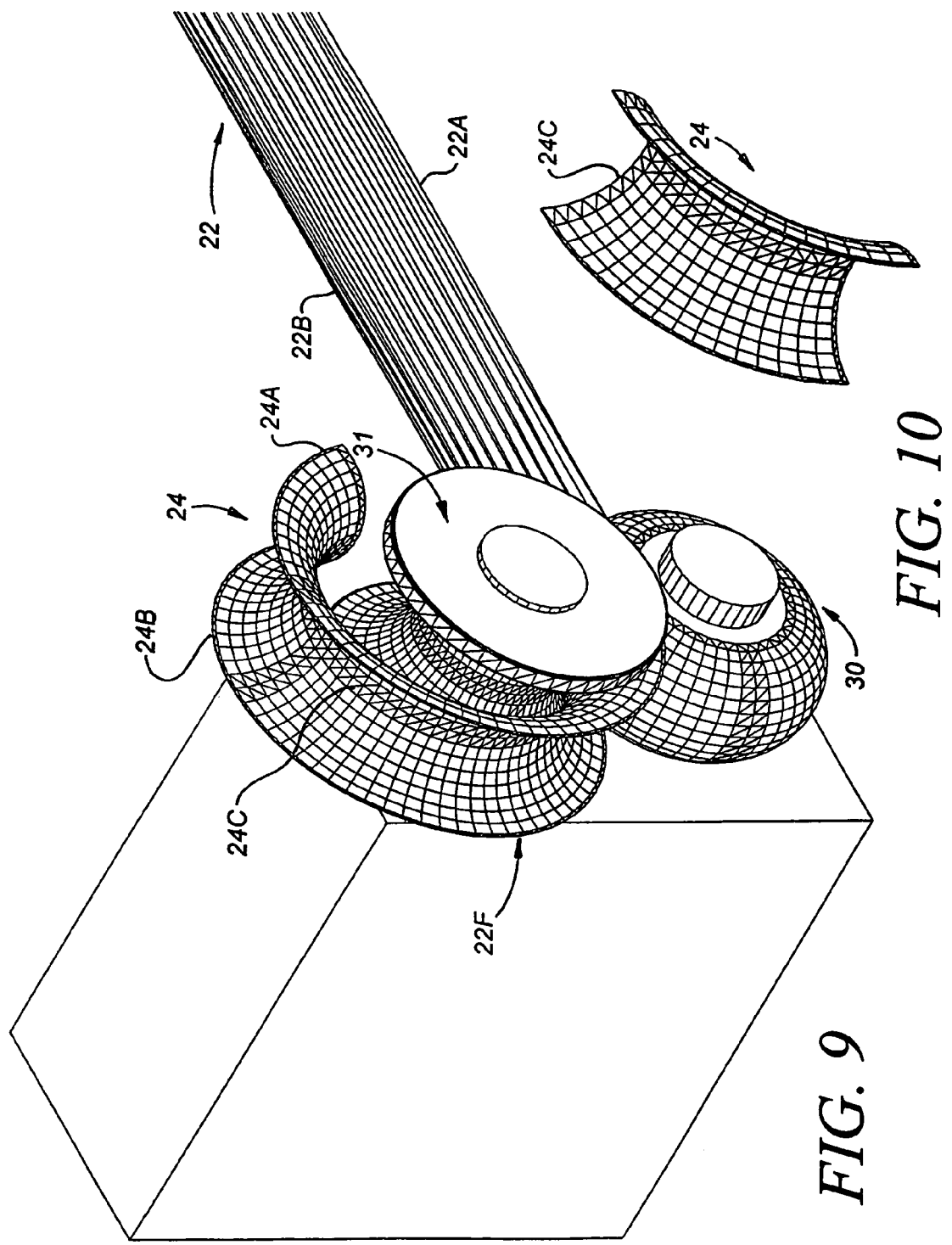
FIG. 9 is a perspective view illustrating the use of a pair of opposed rollers to form another sheet metal part in accordance with the invention.
FIG. 10 is a perspective view illustrating a sheet metal part produced by the rollers of FIG. 9.

FIG. 9 illustrates a pair of opposed rollers 30 and 31 processing a pre-formed strip of metal or other material 24. Metal strip 22 is in a semi-cylindrical configuration (FIGS. 15, 16) and includes edges 22A and 22B and intermediate portion 22C extending between edges 22A and 22B. When strip 22 passes between rollers 30 and 31 it produces strip 22F that includes an arcuate hollow rounded strip or elbow 24 (FIG. 8) that is cut from the end of strip 22F. After elbow 24 is cut from the end of strip 22F, additional elbow equivalent in shape and dimension to elbow 24 can, of course, also be cut from strip 22F.

FIGS. 11 and 12 illustrate elbows 23 and 24 assembled together. Edges 23A and 24A are welded or otherwise fastened together. Edges 23B and 24B are welded or otherwise fastened together. The hollow component 100 illustrated in FIG. 12 is formed. The hollow components 16, 100 illustrated in FIGS. 2 and 12 presently are fabricated from galvanized steel strips and are utilized in HVAC duct systems, although such components can, if desired, be utilized in other systems and applications.

FIGS. 14 and 15 illustrate roller 31 with generally cylindrical concave surface 31A and roller 30 with generally cylindrical convex surface 30A. FIGS. 14 and 15 also provide a view of an end of semi-cylindrical strip 22 before strip 22 passes between rollers 30 and 31.

FIG. 16 illustrates the strip 22E that is produced when strip 22 passes intermediate rollers 30 and 31 and is worked. The thickness T4 of each edge 24A, 24B of strip 22E (and of the elbow 24 at the end of strip 22E) is less than the original thickness T3 of strip 22. The thickness T5 of the center of strip 22E is equivalent to the original thickness T3 of strip 22 although it is possible for thickness T5 to be less that thickness T3. The thickness of elbow 24 tapers from a thickness at the center of elbow 24 that is equivalent to the thickness T3 to a thickness T4 at the edges 24A, 24B that is less than the thickness T3. Thickness T4 is typically 5% to 20%, preferably about 10% to 15%, less than thickness T3. Rollers 30 and 31 are shaped and dimensioned and oriented to work pre-formed strip 22 to produce strip 22E. The thickness of the center of strip 22 is maintained and the thickness of edges 22A and 22B reduced in order to produce an elbow 24 with the bend illustrated in FIG. 13. Strip 22 can, if desired, be completely flat when fed intermediate rollers 30 and 31. When strip 22 is, however, flat, there is an increased risk that the metal or other material comprising strip 22 will buckle or be otherwise damaged. If is therefore presently preferred that strip 22 be preformed to facilitate the working of strip 22 by rollers 31 and 30. Edges 24A and 24B coincide with the circumference of a circle having a diameter that is greater than the circumference of the circle with which the center 24C coincides. Therefore, the diameter of edges 24A and 24B is deemed greater than the diameter of the center 24C. In the events edges 24A and 24B and center 24C each coincide with the circumference of an oval, instead of a circle, the diameter of each edges 24A and 24B, when taken at a point lying on a line emanating from a center or estimate center point of the oval, is still greater than the diameter of center 24C taken at a point lying along the same line. In other words, parts produced in accordance with the method and apparatus of the invention can have an oval, instead of or in combination with a circular shape. One end of a hollow part may be circular and the shape of the part can gradually change such that the other end of the part has an oval shape. Or, the entire part may have an oval shape.

FIGS. 18 and 19 illustrate roller 21 with generally cylindrical concave surface 21A and roller 20 with generally cylindrical convex surface 20A. FIGS. 18 and 18 also provide a view of an end of semi-cylindrical strip 22 before strip 22 passes between rollers 20 and 21.

FIG. 20 illustrates the strip 22F that is produced when strip 22 passes intermediate rollers 20 and 21 and is worked. The thickness T8 of each edge 23A, 23B of strip 22F (and of the elbow 23 cut from the end of strip 22F) is equivalent to the original thickness T3 of strip 22. The thickness T7 of the center of strip 22F is less than the original thickness T3 of strip 22. The thickness of elbow 23 tapers from a thickness at the center of elbow 23 that is less than the thickness T3 to a thickness T8 at the edges 24A, 24B that is equivalent to the thickness T3, although the thickness T8 can be less than thickness T3 (but is always greater than thickness T7). Thickness T7 is typically 5% to 20%, preferably about 10% to 15%, less than thickness T3. Rollers 20 and 21 are shaped and dimensioned and oriented to work pre-formed strip 22 to produce strip 22F. The thickness of the center of strip 22 is reduced and the thickness of edges 22A and 22B generally maintained in order to produce an elbow 23 with the bend illustrated in FIG. 17. Strip 22 can, if desired, be completely flat when fed intermediate rollers 20 and 21. When strip 22 is, however, flat, there is an increased risk that the metal or other material comprising strip 22 will buckle or be otherwise damaged. If is therefore presently preferred that strip 22 be preformed to facilitate the working of strip 22 by rollers 21 and 20. Edges 23A and 23B coincide with the circumference of a circle having a diameter that is less than the circumference of the circle with which the center 23C coincides. Therefore the diameter of edges 24A and 24B is deemed less than the diameter of the center 23C.

FIG. 21 illustrates a pair of opposed rollers 40 and 41 processing a pre-formed strip of metal or other material 44. Metal strip 44 is in a stepped configuration (FIG. 21A) and includes legs 45 and 47 and portion 46 interconnecting legs 45 and 47. When strip 44 passes between rollers 40 and 41 it produces an arcuate rounded strip 49 having sections 45A, 46A, and 47A. The thickness of section 45A is generally equivalent to that of section 45. The thickness of section 47A is generally uniform throughout and is less than that of section 47. The thickness of section 46A lessens or radially tapers from a greatest thickness adjacent and generally equal to the thickness of section 45A to a smallest thickness adjacent and generally equivalent to the thickness of section 47A.

Figure 22:
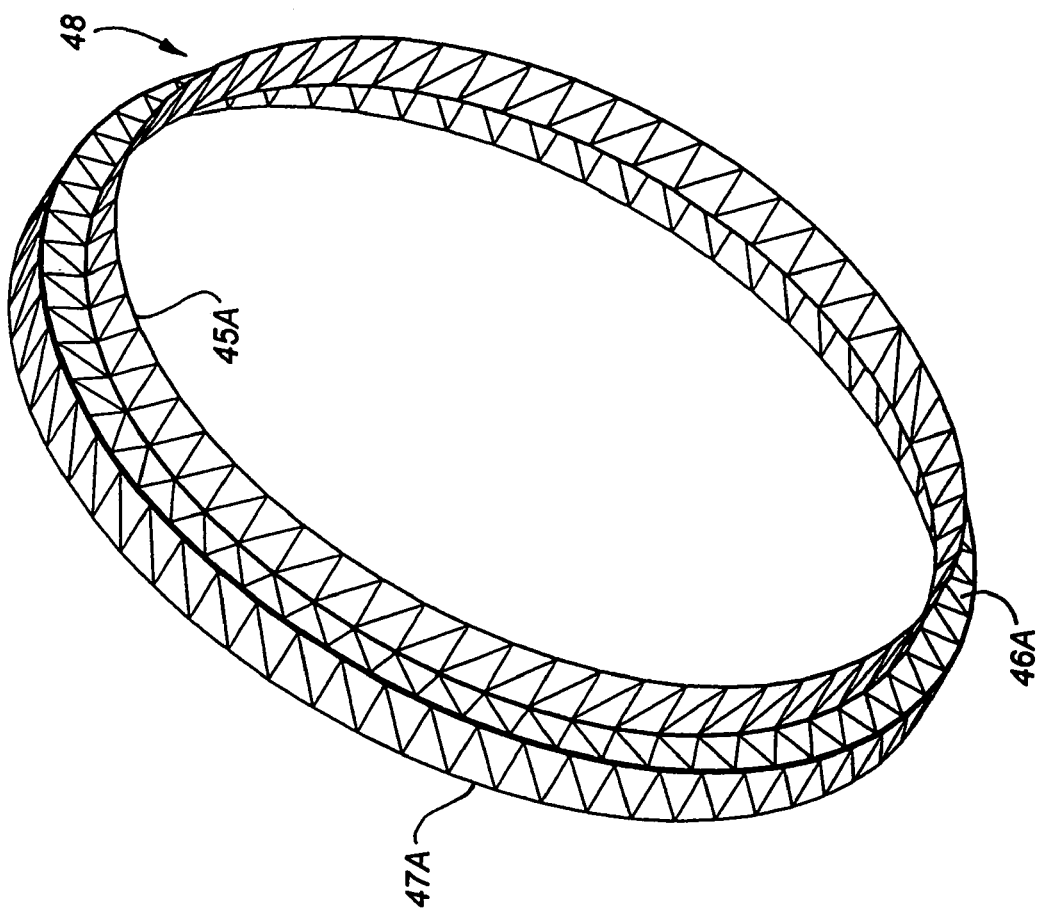
FIG. 22 is a perspective view illustrating the sheet metal part produced by the rollers of FIG. 21.

One piece can be cut from strip 49 to form the hollow cylindrically shaped component 48 illustrated in FIG. 22. In this case, the component 48 consists of a single piece that has two ends that are welded together or otherwise attached. Or, two or more pieces can be cut from strip 49 and welded together to form hollow component 48.

Figure 23:
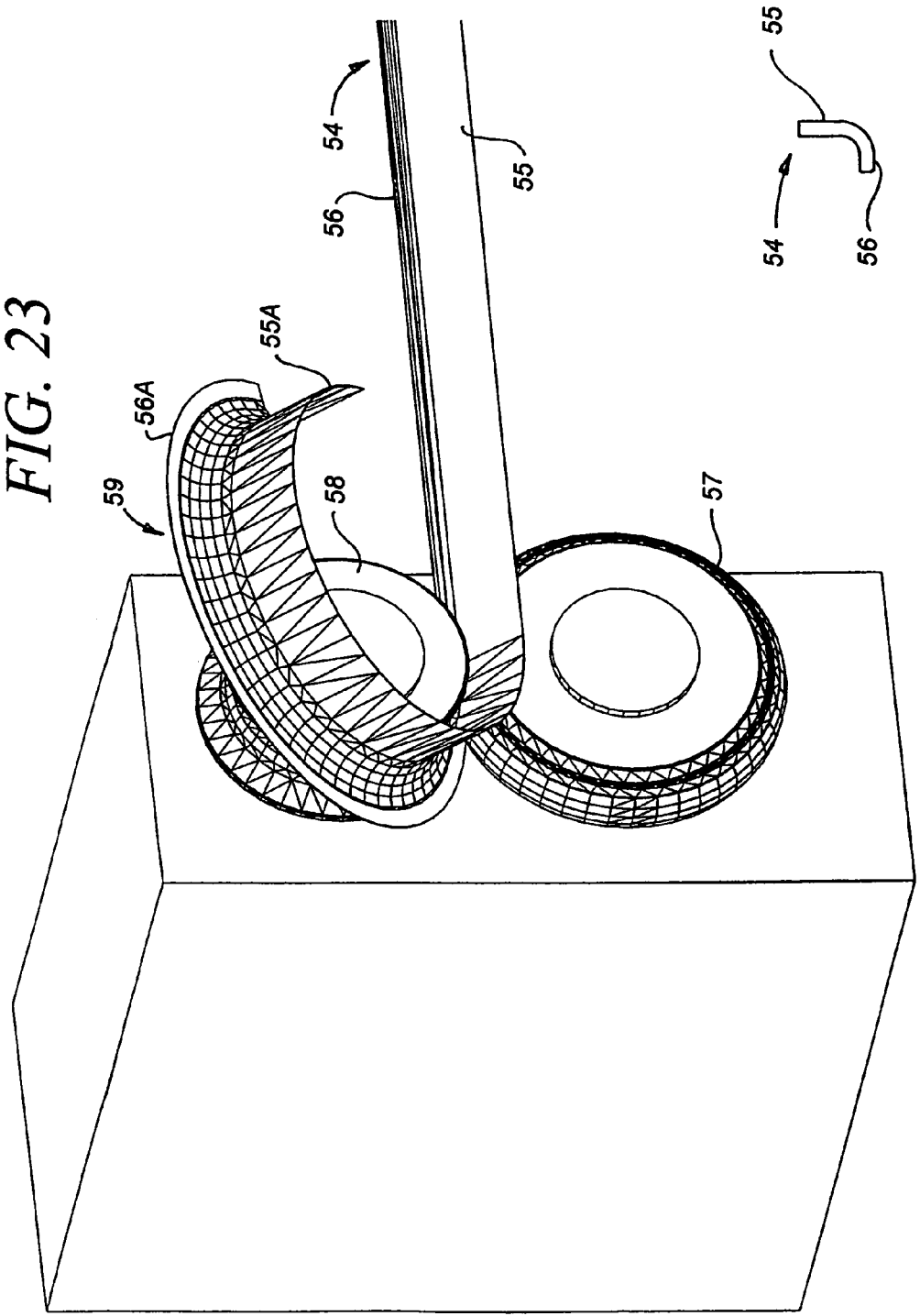
FIG. 23 is a perspective view illustrating the use of a pair of opposed rollers to process a preformed metal strip to form yet another sheet metal part in accordance with the invention.
Figure 23A:
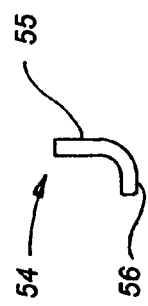
FIG. 23A is an end view illustrating the metal strip of FIG. 23 before it passes intermediate the rollers of FIG. 23; and, FIG. 24 is a perspective view illustrating the sheet metal part produced by the rollers of FIG. 23.
Figure 24:
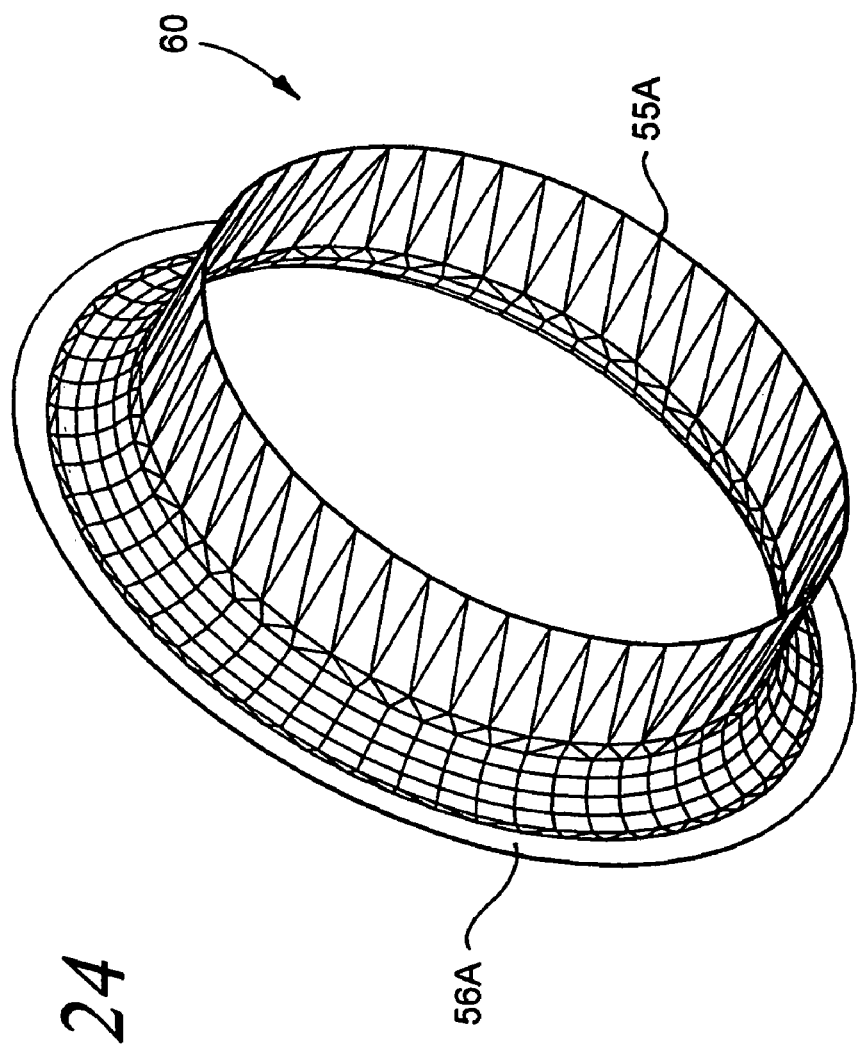

FIG. 23 illustrates a pair of opposed rollers 57 and 58 processing a pre-formed strip of metal or other material 54. Metal strip 54 is in a configuration (FIG. 23A) and includes arcuate leg 56 and leg 55. When strip 54 passes between rollers 57 and 58 it produces an arcuate rounded strip 59 having sections 55A, 56A. The thickness of section 55A is generally equivalent to that of section 55. The thickness of section 56A lessens or radially tapers from a greatest thickness adjacent and generally equal to the thickness of section 55A to a smallest thickness at its outer edge. One piece can be cut from strip 49 to form the hollow cylindrically shaped component 60 illustrated in FIG. 24. In this case, the component 60 consists of a single piece that has two ends that are welded together or otherwise attached. Or, two or more pieces and can be cut from strip 59 and welded together to form hollow component 60.

The sheet metal (or plastic or composite or other material) forming method of the invention ordinarily is performed at ambient, or room temperature, but can, if desired, be performed at elevated temperatures or at cooler temperatures.

Having described my invention in such terms as to enable those of skill in the art to make and practice it, and having described the presently preferred embodiments thereof, I claim:

1. A method for producing in a single pass a hollow, generally conically shaped hollow sheet metal part (16) for a HVAC duct, the part including a conically shaped hollow portion having a first circular edge and a cylindrically shaped hollow portion attached to said edge, said method comprising the steps of
   (a) providing an elongate strip (12) of metal sheet material, said strip having
      (i) a first edge portion (13) to be laterally tapered and rolled into a hollow first round cylindrical configuration having a selected diameter,
      (ii) a second portion (14) connected to said first edge portion to be laterally tapered and rolled into a hollow conical configuration,
   (b) providing first and second opposed rotating rollers each rotating about an axis of rotation and including
      (i) an outer conically shaped surface to engage and taper laterally said second portion (14), and
      (ii) an outer cylindrically shaped surface to engage and taper laterally said first edge portion (13) and cant said first edge portion with respect to said second portion;
   (c) feeding said strip (12) of material through and between said pair of rollers
      (i) to work simultaneously said second portion and said first portion,
      (ii) to taper laterally said second portion and said first portion such that said first portion has a minimum thickness less than the minimum thickness of said second portion,
      (iii) with said first edge portion canted and in a different plane with respect to said second portion, (iv) to cause, when said strip of material exits said rollers, said strip of material to curve about one of said axes of rotation of said rollers, said one of said axes spaced apart from said conically shaped hollow portion and said cylindrically shaped hollow portion, and (v) to produce in a single pass through said pair of rollers the hollow generally conically shaped sheet metal part (16).

* * * * *